United States Patent
Tamura et al.

(10) Patent No.: US 9,370,829 B2
(45) Date of Patent: Jun. 21, 2016

(54) BIT EXCHANGEABLE DRILL

(71) Applicants: Sumitomo Electric Hardmetal Corp., Itami-shi (JP); Sumitomo Electric Industries, Ltd., Osaka-shi (JP); Fuji Jukogyo Kabushiki Kaisha, Tokyo (JP)

(72) Inventors: Takumi Tamura, Itami (JP); Masahiro Yoshida, Mie-gun (JP); Yoshiharu Kaimori, Tokyo (JP); Yuzuru Ono, Handa (JP)

(73) Assignees: SUMITOMO ELECTRIC HARDMETAL CORP., Itami-shi (JP); Sumitomo Electric Industries, Ltd., Osaka-shi (JP); FUJI JUKOGYO KABUSHIKI KAISHA, Tokyo (JP)

( * ) Notice: Subject to any disclaimer, the term of this patent is extended or adjusted under 35 U.S.C. 154(b) by 200 days.

(21) Appl. No.: 14/239,778

(22) PCT Filed: Apr. 5, 2013

(86) PCT No.: PCT/JP2013/060459
§ 371 (c)(1),
(2) Date: Feb. 19, 2014

(87) PCT Pub. No.: WO2013/154044
PCT Pub. Date: Oct. 17, 2013

(65) Prior Publication Data
US 2014/0193220 A1   Jul. 10, 2014

(30) Foreign Application Priority Data

Apr. 11, 2012   (JP) .................................. 2012-090054

(51) Int. Cl.
*B23B 51/02*   (2006.01)

(52) U.S. Cl.
CPC ............. *B23B 51/02* (2013.01); *B23B 2215/04* (2013.01); *B23B 2226/275* (2013.01);

(Continued)

(58) Field of Classification Search
CPC ............ B23B 2251/02; B23B 2251/50; B23B 2251/08; B23B 2251/12; B23B 2251/122; B23B 2251/127; B23B 2251/443; B23B 2251/44; Y10T 408/9098; Y10T 408/90993; Y10T 408/9097

See application file for complete search history.

(56) References Cited

U.S. PATENT DOCUMENTS

| 2,348,874 A | 5/1944 | Andreasson | |
| 2,817,983 A * | 12/1957 | Mossberg | ............... B23B 51/06 408/144 |

(Continued)

FOREIGN PATENT DOCUMENTS

| JP | 55031523 A * | 3/1980 |
| JP | 60-29018 | 2/1985 |

(Continued)

OTHER PUBLICATIONS

Machine translation of JP 2003-117708, printed Nov. 2015.*

(Continued)

*Primary Examiner* — Daniel Howell
(74) *Attorney, Agent, or Firm* — Venable LLP; Michael A. Santori; Laura G. Remus (57) ABSTRACT

A bit exchangeable drill includes a detachable cutting head at the tip of a drill body, and the cutting head includes a cutting edge extending linearly from a rotation center to a radial outer end in axial end view, and a helical flute. At a rake face continuous with the cutting edge, a thinning face inclined relative to the rotation axis and rendering an axial rake angle of the cutting edge negative is formed entirely from a radial inner end to a radial outer end of the cutting edge.

6 Claims, 6 Drawing Sheets

(52) U.S. Cl.
CPC ........ *B23B 2251/02* (2013.01); *B23B 2251/18* (2013.01); *B23B 2251/443* (2013.01); *Y10T 408/9097* (2015.01); *Y10T 408/9098* (2015.01)

(56) References Cited

U.S. PATENT DOCUMENTS

| | | | | |
|---|---|---|---|---|
| 4,950,108 A * | 8/1990 | Roos | ........................ | B23B 51/02 279/8 |
| 5,217,332 A | 6/1993 | Takasaki et al. | | |
| 5,609,447 A * | 3/1997 | Britzke | ................... | B23B 51/02 408/144 |
| 6,585,460 B1 * | 7/2003 | Meece | .................... | B23B 51/02 408/227 |
| 7,201,544 B2 * | 4/2007 | Nakashima | ............. | B23B 51/02 408/211 |
| 7,530,772 B2 * | 5/2009 | Reinhardt | ................ | B23B 51/02 408/227 |
| 2012/0087753 A1 | 4/2012 | Kataoka et al. | | |

FOREIGN PATENT DOCUMENTS

| | | | |
|---|---|---|---|
| JP | 1-117813 | | 8/1989 |
| JP | H05-177420 | A | 7/1993 |
| JP | 2000-190323 | A | 7/2000 |
| JP | 2001-179518 | A | 7/2001 |
| JP | 2002-066820 | A | 3/2002 |
| JP | 2003-025128 | A | 1/2003 |
| JP | 2003117708 | A * | 4/2003 |
| JP | 2005-186247 | A | 7/2005 |
| JP | 2008188701 | A * | 8/2008 |
| JP | 2009-142963 | A | 7/2009 |
| JP | 2010-173007 | A | 8/2010 |
| JP | 2011101928 | A * | 5/2011 |
| JP | 2012-011481 | A | 1/2012 |

OTHER PUBLICATIONS

International Search Report in PCT International Application No. PCT/JP2013/060459, dated Jul. 2, 2013.

Notice of Grounds of Rejection in Japanese Patent Application No. 2013-247031, dated Sep. 16, 2014.

Extended European Search Report for European Patent Application No. 13775221.8, dated Nov. 17, 2015.

* cited by examiner

BIT EXCHANGEABLE DRILL

TECHNICAL FIELD

The present invention relates to a bit exchangeable drill particularly suitable for machining a layered sheet of FRP (Fiber Reinforced Plastics) and metal.

BACKGROUND ART

In recent years, attention is focused on FRP, particularly CFRP (Carbon Fiber Reinforced Plastics) as the structural material for the bodies and wings of aircrafts. CFRP may be offered as a composite sheet material based on a combination of titanium alloy, aluminium, and the like.

The composite plate employs a sheet having metal laminated on one face of CFRP (hereinafter, simply referred to as "laminated sheet"). The laminated sheet must have a hole bored to allow a joining member such as a bolt or rivet to be inserted when the laminated sheet is to constitute a body, wing, or the like of an aircraft.

As a tool to bore a hole, the drill proposed for machining FRP disclosed in Japanese Patent Laying-Open No. 5-177420 (PTD 1), for example, may be employed.

The drill disclosed in PTD 1 has the point angle set in multi-stages. The point angle of the outer diameter side is set smaller than the point angle of the inner diameter side. The multi-stage setting causes the spreading action at the outer circumferential side of the bit (outer end side in the outer radial direction) to be reduced, such that generation of a burr can be suppressed at the exit side (egress) of the through hole that is bored.

CITATION LIST

Patent Document

PTD 1: Japanese Patent Laying-Open No. 5-177420

SUMMARY OF INVENTION

Technical Problem

Although the advantage of the multi-stage point angle is exhibited by the drill of PTD 1 in the work on a single sheet of FRP, the strength is not sufficient in machining the aforementioned laminated sheet that has metal laminated on CFRP. Particularly, in the case where a pilot hole is bored and then main machining is carried out with the same drill, the bit readily chips when meeting the pilot hole.

Machining with a pilot hole can suppress increase of the working force. Therefore, the machining task on the aforementioned laminated sheet can be carried out by boring a pilot hole in advance with a solid drill of the general configuration used in metal machining. However, the problem of the bit being chipped when meeting the pilot hole may occur.

As measures for preventing bit chipping, the bit strengthening treatment by applying the so-called negative land and honing is known. However, these measures are disadvantageous in that the alleviating effect of the main axis load is degraded due to the cutting sharpness rendered blunt, and delamination (peeling between layers; peeling of CFRP, peeling between CFRP and metal) readily occurs at the hole entrance and exit in the laminated sheet.

In view of the foregoing, the present invention aims to reduce, in a drill directed to machining FRP, particularly the aforementioned laminated sheet, bit chipping while suppressing delamination that induces degradation in product quality, such that balance between reliability in favorable working performance and improvement in durability is established.

Solution to Problem

To achieve the aforementioned aim, the present invention is based on a bit exchangeable drill including a detachable cutting head at the tip of a drill body, the cutting head including a cutting edge extending linearly from a rotation center to a radial outer end in axial end view, and a helical flute. At a rake face continuous to the cutting edge, a thinning face (negative thinning face) inclined relative to a rotation axis, and rendering an axial rake angle of the cutting edge negative is formed. The thinning face is arranged entirely from a radial inner end to a radial outer end of the cutting edge. A rotation center section may have a chisel edge with a chisel width less than or equal to 0.5 mm.

At the bit exchangeable drill, a tilt angle $\theta$ of the thinning face relative to the rotation axis (=axial rake angle of the cutting edge) is preferably set at $0°<\theta<25°$, more preferably at $5°<\theta<10°$.

The dimension of the thinning face (thinning width) W in the direction of the rotation axis at the radial outer end of the cutting edge is preferably set to 0.2 mm to 1.0 mm.

At an outer circumferential land of the cutting head, a main margin adjacent to the helical flute and a submargin arranged backward of the main margin in the drill rotation direction are provided. The size (radial dimension) of the clearance formed between these two margins (the escape formed between these two margins) is preferably set at 0.3 mm to 1.0 mm.

Moreover, the cutting head is preferably provided with a back taper of $1/100$ to $1.5/100$ mm. Additionally, the helical flute preferably has a helix angle of approximately 20° that is a weak twist.

Advantageous Effects of Invention

The drill of the present invention includes a cutting edge extending linearly from the rotation center to the radial outer end, and the entire region of the cutting edge has a negative rake angle by the provision of a thinning face. Therefore, the balance between suppressing delamination and improving the durability of the cutting edge can be established.

The drill that allows the cutting head to be exchanged can have the back taper set great (for example, approximately the aforementioned $1/100$ to $1.5/100$ mm), as compared to a solid drill. Therefore, the friction surface can be reduced to suppress generation of heat at the time of machining, which in turn allows degradation in the quality of the drilled face (scorching of the hole wall surface) to be suppressed.

By setting the rake angle of the entire region of the cutting edge negative (negative angle) by providing a thinning face at the rake face along the cutting edge, the defect resistance of the cutting edge is improved to suppress chipping thereof when meeting the pilot hole.

According to the structure of improving the defect resistance of the cutting edge by providing a thinning face, reduction in the cutting sharpness is not as significant as a drill having the bit enhanced by providing a negative land or honing treatment. Moreover, the leading edge becomes acute by the configuration of the cutting edge extending linearly from the rotation center to the radial outer end. Accordingly, the carbon fiber of CFRP can be cut more readily to ensure the delamination suppressing feature.

Since the bit exchangeable drill has the tool cost reduced as compared to that of a solid drill, the cost efficiency particularly increases when using a drill having a diameter exceeding 12 mm where a large amount of material is used. Although the tool management in a short polishing cycle is tedious in the machining task of a laminated sheet of CFRP by which the lifespan is significantly reduced as compared to that in the machining task of metal, the bit exchangeable drill can eliminate the re-polishing process for bit reproduction, which is advantageous from the standpoint of tool management.

DESCRIPTION OF EMBODIMENTS

An embodiment of a bit exchangeable drill according to the present invention will be described hereinafter based on FIGS. 1-10. The drill of FIGS. 1-4 includes a drill body 1 formed of tool steel and the like. At the tip of drill body 1, a cutting head 2 is attached in a detachable manner with two fastening bolts 3. Two cutting edges 4, 4 of central symmetry are provided at cutting head 2. Furthermore, there are provided two lines of helical flutes 5, 5 for removing chips, main margins 6, 6, and submargins 7, 7.

Figure 1:
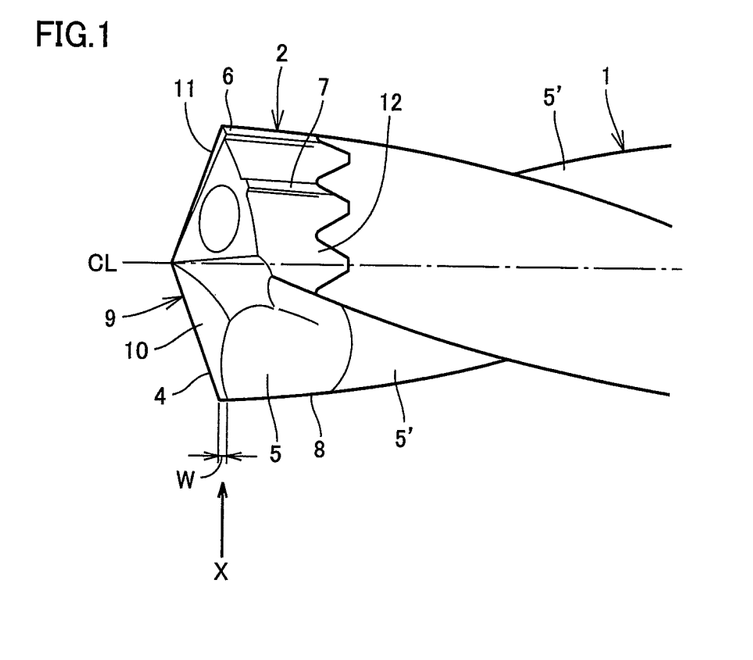
FIG. 1 is a side view of an example of a drill according to the present invention.

Drill body 1 includes two lines of helical flutes 5', 5' continuous with helical flutes 5, 5 of cutting head 2. There is no margin at drill body 1. The outer diameter of drill body 1 is smaller than the outer diameter of cutting head 2 at the axial trailing end.

Cutting head 2 is provided with a back taper of $1/100$ to $1.5/100$ mm. Such application of a great back taper allows the friction heat during machining to be suppressed.

Figure 3:
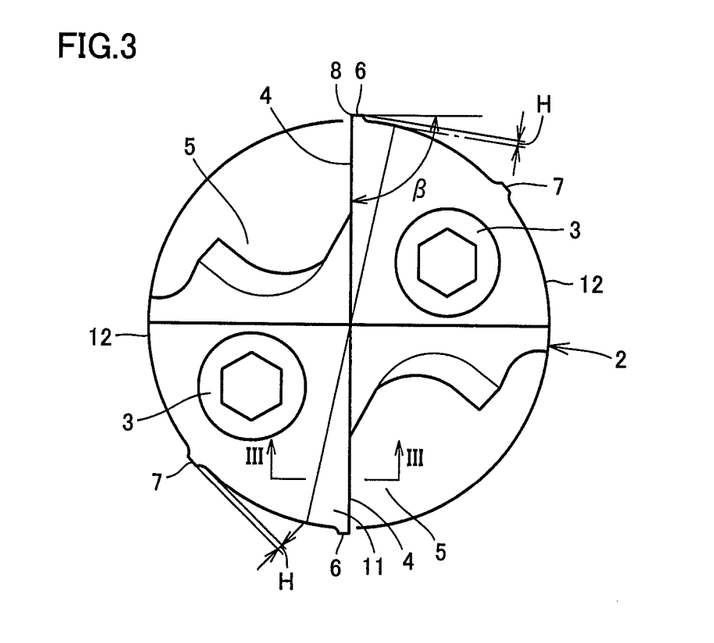
FIG. 3 is a front view of the drill shown in FIG. 1.
Figure 4:
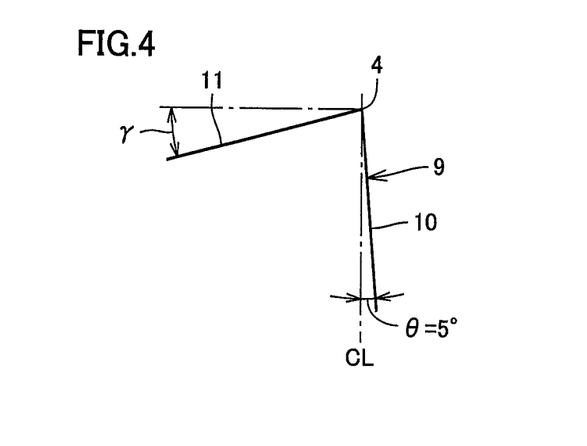
FIG. 4 is an enlarged sectional view of the region along line III-III of FIG. 3.
Figure 9:
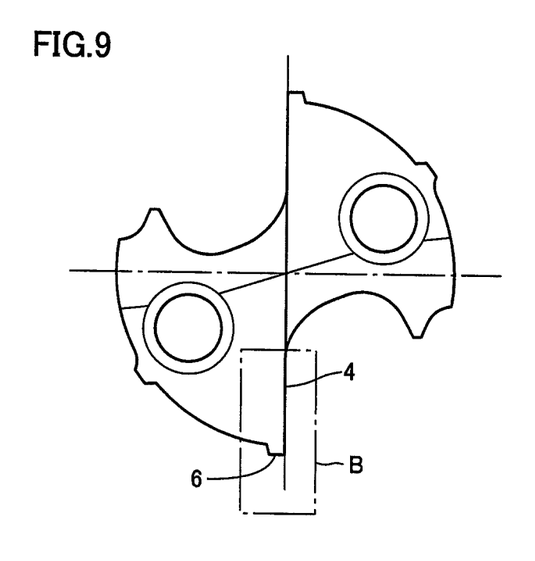
FIG. 9 is a diagram to describe an axially ascending angle of a drill providing a chisel edge according to the present invention.
Figure 10:
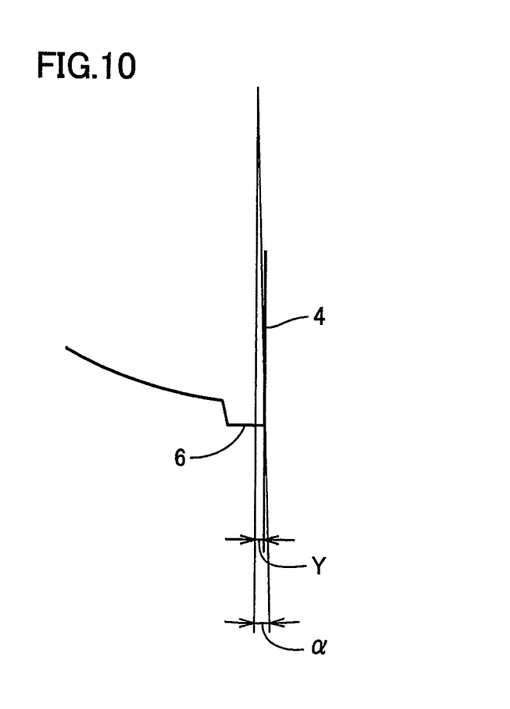
FIG. 10 is an enlarged view of a region B in FIG. 9.
Figure 11:
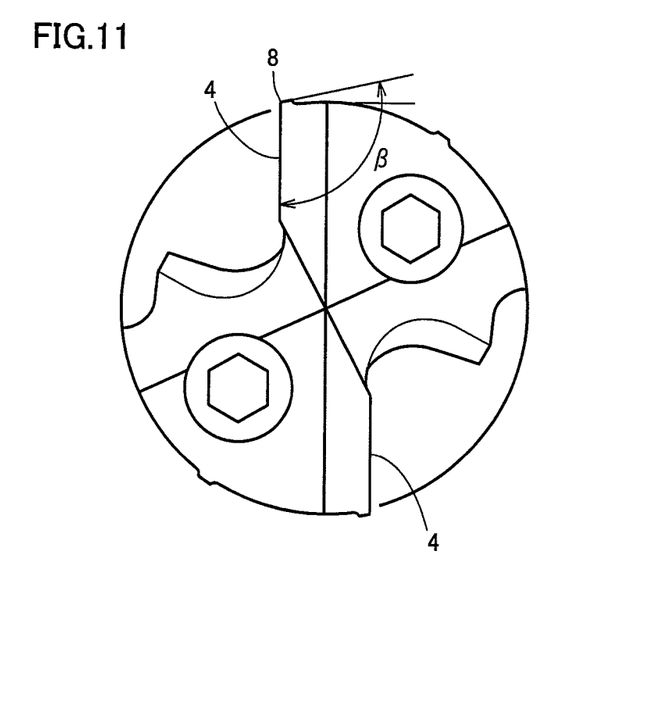
FIG. 11 is a front view of a general bit of a drill.

Cutting edges 4, 4 provided at cutting head 2 extend linearly from the rotation center to the radial outer end in axial end view of the drill (front view). In contrast to a general bit as shown in FIG. 11 whose contact angle $\beta$ between cutting edge 4 and a workpiece is a great obtuse angle ($\beta>90°$) at the region of leading edge 8, the linear cutting edge can have the contact angle $\beta$ between cutting edge 4 and a workpiece set at 90°, as shown in FIG. 3, facilitating fiber cutting. Since the effect of the present invention can be achieved by keeping contact angle $\beta$ in the vicinity of 90°, the cutting edge may have a small axially ascending amount. Specifically, cutting edge 4 may have a chisel edge at the rotation center section. The width of this chisel edge is preferably less than or equal to 0.5 mm from the relation with contact angle $\beta$. By setting the width of the chisel edge less than or equal to 0.5 mm, the axially ascending amount Y is also small, allowing the axially ascending angle $\alpha$ shown in FIGS. 7 and 8 to be suppressed to a small angle, as shown in FIGS. 9 and 10. Therefore, the contact angle of the outer end of the cutting edge with the workpiece is kept small, allowing the delamination suppressing effect to be exhibited as expected. This was confirmed by experiments.

At a rake face 9 along cutting edge 4, a thinning face 10 is provided. Thinning face 10 is inclined in a direction where the axial back portion of the face is away with respect to the rotation axis (center axis line) C of the drill, and provided at a region starting from the inner end located at the rotation center to the radial outer end of the cutting edge. Accordingly, a negative rake angle is provided at the entire region of cutting edge 4.

The inclination angle $\theta$ relative to rotation axis CL of thinning face 10 is set preferably at the range of $0°<\theta<25°$, more preferably 5° to 10°. If the tilt angle $\theta$ is less than or equal to 0°, the strengthening effect of the bit will be insufficient. If the tilt angle $\theta$ exceeds 25°, delamination suppression will be insufficient due to reduction in the cutting sharpness.

Figure 2:
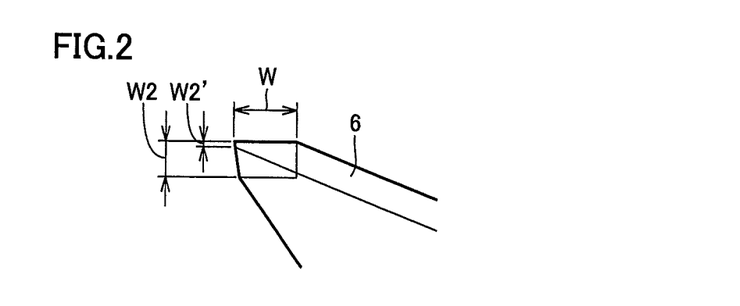
FIG. 2 is an enlarged view of the margin section in the vicinity of the outer end of the cutting edge, viewed from the direction of X in FIG. 1.

The dimension in the direction of the rotation axis of thinning face 10 at the radial outer end of the cutting edge (W in FIGS. 1 and 2) is preferably set at 0.2 mm to 1.0 mm. Although this width W is preferably set greater than or equal to 0.2 mm to achieve the bit strengthening effect, a large width will cause the margin width W2' (rotating direction) in the proximity of the cutting edge to become small, as shown in FIG. 2, in the case of a margin-included drill whose helix angle and/or thinning face tilt angle is great. Since the guiding effect of the margin will be degraded if the region where the margin width is small becomes great, W is more preferably set at 1.0 mm or below.

The clearance angle $\gamma$ (refer to FIG. 4) of front flank face 11 at the tip is set at 15°. Although clearance angle $\gamma$ is not limited to this value, the bit strengthening effect by virtue of thinning face 10 will be reduced to increase the possibility of chipping if this clearance angle is too large. If the clearance angle is too small, the possibility of front flank face 11 being galled due to resilient deformation of the workpiece will be increased, leading to the increase of thrust during machining despite a pilot hole being bored in the workpiece.

Main margin 6 is provided at the tip of land 12 in the rotation direction, i.e. along leading edge 8, as shown in FIG. 3. By the so-called double margin design having a submargin 7 provided at the outer circumference of the land at a location shifted from main margin 6 by a predetermined amount toward the rear in the rotating direction, disturbance in the behavior when meeting the workpiece can be suppressed by the improvement in guidance by virtue of the provision of the submargin.

It is to be noted that, when machining with a pilot hole, the behavior during cutting may be disturbed since the axis center of the pilot hole may not match the axis center of the tool. Therefore, during FRP machining, the swarf in powder form and/or the swarf of titanium alloy will readily enter the clearance at the outer circumference of the land (the gap formed relative to the inner circumferential face of the working hole).

Figure 5:
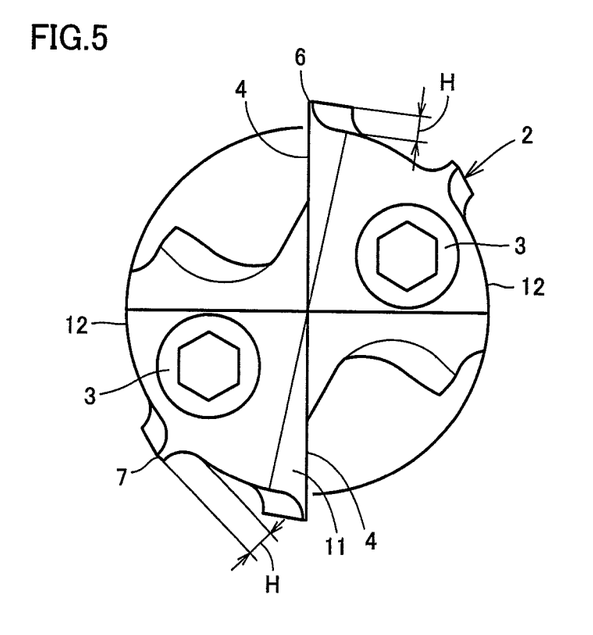
FIG. 5 is a front view of the drill of the present invention based on an example where the margin height is increased.
Figure 6:
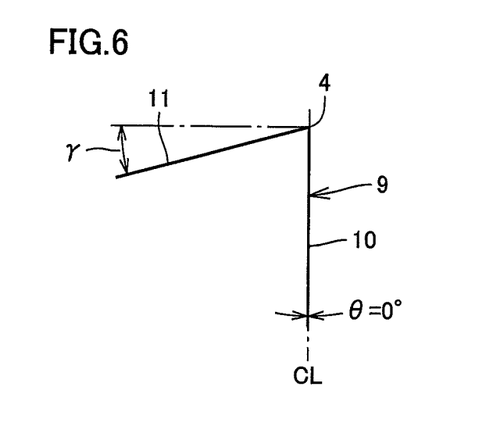
FIG. 6 represents a drill with no thinning face ($\theta=0°$), corresponding to the cross section of III-III in FIG. 3.
Figure 7:
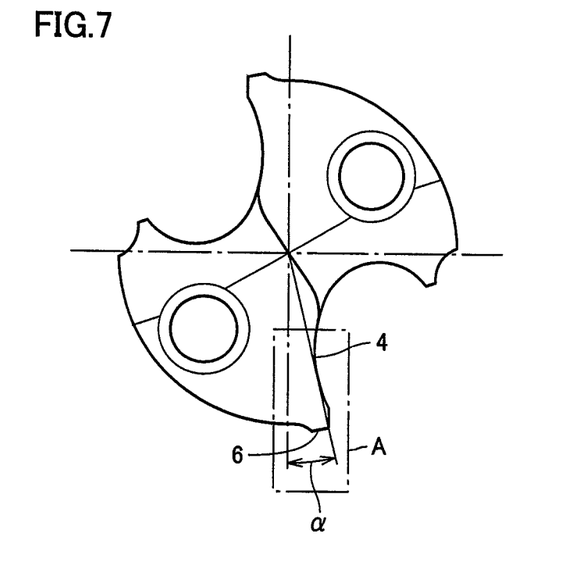
FIG. 7 is a diagram to describe an axially ascending angle of a conventional drill.
Figure 8:
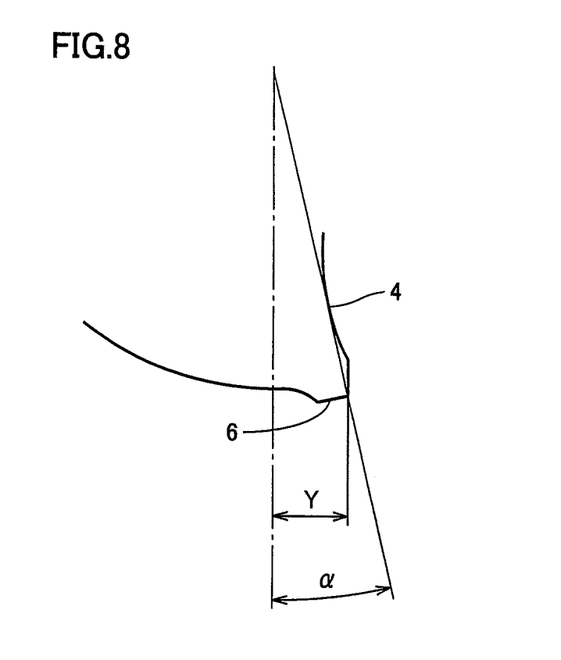
FIG. 8 is an enlarged view of a region A in FIG. 7.

In order to alleviate the clogging of swarf into this clearance, the margin height is designed relatively high as compared to that of a general metal-working drill without a pilot hole. An advantage was found by setting the size of the clearance formed between main margin 6 and submargin 7 as shown in FIG. 5 (the escape formed between the two margins) at 0.3 mm to 1.0 mm to achieve the margin configuration shown in FIG. 5. For width W2 of main margin 6 and submargin 7, the range of approximately 0.4 mm to 1.2 mm was preferable from the standpoint of maintaining the guiding performance while suppressing the area of contact with a workpiece. Moreover, submargin 7 is preferably located at the backward side of main margin 6 in the rotating direction by 40°-60°.

The point angle of the drill is set at 137°-143°, slightly greater than the point angle of a general metal-working drill (typically 135°). By selecting this range for the point angle and the design of double margin, the behavior in meeting a pilot hole when machining a laminated sheet having a pilot hole can be rendered stable.

EXAMPLES

Example 1

To evaluate the performance of the drill of the present invention, cutting tests on a workpiece were carried out using the drill set forth below.

Drill A (product of present invention): a bit exchangeable drill of double margin, having a cutting head attached to the tip of the drill body. Diameter φ 14.00 mm; straight bit having small honing at cutting edge, including thinning face. Thinning face tilt angle $\theta=5°$; helical flute helix angle=20°; clearance angle γ of front flank face γ=15°.

Drill B (Comparative Product): including thinning face. Thinning face tilt angle $\theta=0°$ (refer to FIG. 6). The remaining specification is identical to drill A.

Figure 12:
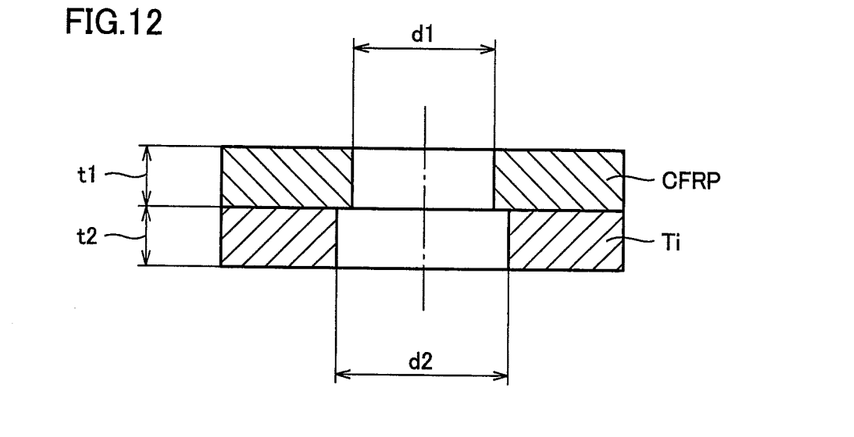
FIG. 12 is a sectional view representing an example of a workpiece.

Workpiece: a laminated plate formed by CFRP having thickness t1=11.0 mm, and titanium alloy of composition Ti-6Al-4V having thickness t2=8.0 mm (refer to FIG. 12). A pilot hole of diameter φd1=9.50 mm was bored in CFRP. A pilot hole of diameter φd2=10.50 mm was bored in titanium alloy, concentric with the pilot hole in CFRP.

Cutting Condition: cutting rate Vc=17.15 m/min (n=390 rpm) feeding amount f=0.0504 mm/rev (Vf=19.8 mm/min)

Cutting Form: oil mist (alcoholic coolant used)

The drill was threaded into the workpiece with the outer circumference of the body guided at the leading end side with a jig. As a result, the comparative product had the cutting edge chipped at the stage of boring two holes. In contrast, the cutting edge of the present invention was sound even at the point in time of boring 30 holes.

Example 2

Using drill A (product of present invention) of Example 1 having an acute leading edge, and a general bit drill C of FIG. 11 having an obtuse leading edge (Comparative Product 2, specification except for the bit identical to that of the product of the present invention), a hole spreading machining task into the laminated plate cited in Example 1 was carried out. The cutting conditions were identical to those of Example 1.

As a result, delamination occurred in the machining task by Comparative Product 2, but not in the machining task by the drill of the present invention.

Example 3

Using drill A1 and drill A2 corresponding to drill A of Example 1, having width dimension W of the thinning face in the direction of the rotation axis at the radial outer end of the cutting edge set at W=0.7 mm and W=1.2 mm, respectively (both drills are products of present invention; remaining specification both identical to drill A of Example 1 except for W), a hole spreading machining task into the laminated plate cited in Example 1 was carried out. The conditions of these testing were identical to those of Example 1.

As a result, drill A2 having the width (rotating direction) of the main margin reduced by setting W larger exhibited chipping after boring one hole, whereas chipping did not occur even after boring 10 holes in the machining task by drill A1.

Example 4

Using drill A3 and drill A4 having the height H of the main margin and submargin set at 0.2 mm and 0.5 mm, respectively (both drills are products of present invention; remaining specification both identical to drill A of Example 1 except for margin height), a hole spreading machining task into the laminated plate cited in Example 1 was carried out. The cutting conditions in the testing were identical to those of Example 1.

As a result, in the machining task by drill A3, swarf was deposited at the clearance between the land and the inner circumferential face of the working hole to exhibit torque increase at the point in time of boring 10 holes. Also, the swarf of titanium alloy was deposited between the two margins to cause welding. In contrast, no such inconvenience occurred in the machining task by drill A4.

Example 5

Using drill A of Example 1 and a solid type drill C' having the general bit of FIG. 11, a hole spreading machining task of 20 holes continuously into the laminated plate cited in Example 1 was carried out. The cutting conditions in the testing were identical to those of Example 1.

As a result, drill C' required repolishing once since increase in delamination occurred by the chipping or wear after boring 10 holes. Drill A could be used continuously even after boring 20 holes. At the point in time of boring 20 holes, drill A was advantageous in that the time required for the machining task was one hour less than that of drill C' due the time-consuming tool exchange process carried out after boring 10 holes.

REFERENCE SIGNS LIST

1 drill body; 2 cutting head; 4 cutting edge; 5, 5' helical flute; 6 main margin; 7 submargin; 8 leading edge; 9 rake face; 10 thinning face; 11 front flank face; 12 land; CL rotation axis; θ tilt angle of thinning face; α axially ascending angle; β contact angle with workpiece; γ clearance angle; H height of margin; W width dimension of thinning face in direction of rotation axis at outer end of cutting edge; W2 margin width.

The invention claimed is:

1. A bit exchangeable drill including a detachable cutting head at a tip of a drill body, said cutting head including a cutting edge extending linearly from a rotation center to a radial outer end in axial end view, and a helical flute, wherein
a thinning face inclined relative to a rotation axis, and rendering an axial rake angle of the cutting edge negative is formed at a rake face continuous to said cutting edge, and said thinning face is arranged entirely from a radial inner end to a radial outer end of said cutting edge, and
a tilt angle θ of said thinning face relative to the rotation axis satisfies a condition of $0°<\theta<25°$.

2. The bit exchangeable drill according to claim 1, wherein a width dimension of said thinning face in a direction of the rotation axis at a radial outer end of the cutting edge is set at 0.2 mm to 1.0 mm.

3. The bit exchangeable drill according to claim 1, wherein a main margin adjacent to said helical flute and a submargin arranged backward of said main margin in a drill rotation direction are formed at an outer circumferential land of said cutting head, and a size of clearance formed between the two margins is set at 0.3 mm to 1.0 mm.

4. A bit exchangeable drill including a detachable cutting head at a tip of a drill body, said cutting head including a cutting edge extending linearly from a neighborhood of a rotation center to a radial outer end in axial end view, and a helical flute, wherein
said cutting edge has a chisel edge less than or equal to 0.5 mm,
a thinning face inclined relative to a rotation axis, and rendering an axial rake angle of the cutting edge negative is formed at a rake face continuous to said cutting edge, and said thinning face is arranged entirely from a radial inner end to a radial outer end of said cutting edge, and
a tilt angle θ of said thinning face relative to the rotation axis satisfies a condition of 0°<θ<25°.

5. A bit exchangeable drill including a detachable cutting head at a tip of a drill body, said cutting head including a cutting edge extending linearly from a rotation center to a radial outer end in axial end view, and a helical flute, wherein
a thinning face inclined relative to a rotation axis, and rendering an axial rake angle of the cutting edge negative is formed at a rake face continuous to said cutting edge, and said thinning face is arranged entirely from a radial inner end to a radial outer end of said cutting edge, and
a main margin adjacent to said helical flute and a submargin arranged backward of said main margin in a drill rotation direction are formed at an outer circumferential land of said cutting head, and a size of clearance formed between the two margins is set at 0.3 mm to 1.0 mm.

6. A bit exchangeable drill including a detachable cutting head at a tip of a drill body, said cutting head including a cutting edge extending linearly from a neighborhood of a rotation center to a radial outer end in axial end view, and a helical flute, wherein
said cutting edge has a chisel edge less than or equal to 0.5 mm,
a thinning face inclined relative to a rotation axis, and rendering an axial rake angle of the cutting edge negative is formed at a rake face continuous to said cutting edge, and said thinning face is arranged entirely from a radial inner end to a radial outer end of said cutting edge, and
a main margin adjacent to said helical flute and a submargin arranged backward of said main margin in a drill rotation direction are formed at an outer circumferential land of said cutting head, and a size of clearance formed between the two margins is set at 0.3 mm to 1.0 mm.

\* \* \* \* \*